TAPE SKEW CORRECTION CIRCUITRY

Filed Sept. 18, 1967

INVENTORS
MICHAEL I. BEHR
ROBERT A. SMITH
BY Christie, Parker & Hale
ATTORNEYS.

INVENTORS.
MICHAEL I. BEHR
ROBERT A. SMITH
BY Christie, Parker & Hale
ATTORNEYS.

Feb. 9, 1971 M. I. BEHR ET AL 3,562,723

TAPE SKEW CORRECTION CIRCUITRY

Filed Sept. 18, 1967 3 Sheets-Sheet 3

INVENTORS.
MICHAEL I. BEHR
ROBERT A. SMITH
BY
Christie, Parker & Hale
ATTORNEYS.

United States Patent Office 3,562,723

Patented Feb. 9, 1971

3,562,723
TAPE SKEW CORRECTION CIRCUITRY

Michael I. Behr, South Pasadena, and Robert A. Smith, Temple City, Calif., assignors to Burroughs Corporation, Detroit, Mich., a corporation of Michigan Filed Sept. 18, 1967, Ser. No. 668,490
Int. Cl. G11b 5/44, 27/02
U.S. Cl. 340—174.1 14 Claims

ABSTRACT OF THE DISCLOSURE

In a multiple channel tape handling system, the skew error attributable to azimuth misalignment of the tape is corrected by introducing proportional variable time delays individual to the channels. The skew error attributable to gap scatter of the read head is corrected by introducing fixed time delays individual to the channels. Specifically, fixed resistors individual to the channels on the tape determine the gap scatter correction and a single variable resistor determines the azimuth correction.

BACKGROUND OF THE INVENTION

This invention relates to information storage on tape and, more particularly, to skew correction circuitry especially well suited for magnetic tape handling systems in which the information is stored in a plurality of longitudinal channels.

In binary data handling systems, it is customary to store binary bits of information in longitudinal, parallel channels on magnetic tape for the purpose of achieving a high bit density. Usually, the binary bits of information forming one character are stored side by side, one in each channel. Thus, in the case of a seven-bit character code, for example, the binary information is recorded on the tape in seven longitudinal channels such that one character bit is stored in each channel. Ideally, the pulses generated in recovering the binary bits of a character stored on the tape occur simultaneously. The variation in the time of occurrence of these pulses from the ideal condition is designated "skew."

When the information bits are packed close together longitudinally, the errors occasioned by skew as the information is recovered from the tape become more numerous. Specifically, the pulses generated in recovering the character bits in one or more channels move sufficiently out of phase with the pulses generated in recovering the character bits in the other channels so as to fall outside of the time interval allotted to the decoding of the bits forming the character.

A common technique for correcting skew in a tape handling system is to introduce a variable delay into the signal path of each channel of the read and/or write circuits. The variable delays are separately adjusted until the pulses generated in recovering the bits forming a character occur simultaneously. The separately variable delays are generally introduced by variable delay lines or resistance capacitance timing circuits having a variable resistor or capacitor to change the delay. The provision of a variable component for each channel is costly. Further, a good deal of time is consumed in separately setting variable components each time an adjustment of the skew correction is to be made. The expenditure of cost and time becomes particularly apparent in multiple station tape handling equipment in which skew correction is accomplished by this technique because each channel of each station must have a variable component to provide adjustable skew correction.

Tape skew can be attributed to two sources. The first source is gap scatter in the magnetic read and write heads. Ideally, the heads are constructed so the centers of the gaps for all the channels are aligned on a single straight line. In practice, complete alignment of these gaps is never attained. Instead, the gaps are scattered about an imaginary straight line in an irregular, somewhat random fashion. The gap scatter associated with each head is unique and remains essentially invariant in the course of operation with that head.

The second source of tape skew is azimuth misalignment. Ideally, the tape is guided during transport such that the adjacent bit positions of all the channels on the tape, i.e. the bit positions of each character, are aligned along a line forming precisely a 90-degree azimuth angle with the direction of tape travel. In practice, this line deviates slightly from the ideal azimuth angle. As a result, the positions of the bits forming a character are misaligned by amounts that increase proportionately in successive channels starting at one edge of the tape. Azimuth misalignment is, in part, static, that is it remains unchanged in the course of tape transport until one of the tape guiding components is disturbed or replaced. Azimuth misalignment is also, in part, dynamic, that is it changes continually in the course of tape transport because of irregularities in the guided edge of the tape, dirt particles, and various other factors.

SUMMARY OF THE INVENTION

The invention utilizes the fact that, as a result of azimuth misalignment, adjacent bit positions are displaced in successive channels starting at one edge of the tape by proportionately increasing amounts. An azimuth correction circuit is provided that introduces time delays into the signal paths of the read and/or write circuitry for each channel in the same proportionately increasing amounts as the azimuth misalignment in response to the variation of a single parameter or component. Thus, the complexity of the correction circuitry and the time required to adjust it are reduced. In the recovery of binary data, as distinguished from recording, the arrangement is particularly well suited for correcting dynamic azimuth misalignment which would otherwise give rise to errors in the information retrieved from the tape. Since only a single variable parameter is involved in making the azimuth corrections for all the channels, errors in the recovery of data caused by dynamic azimuth misalignment can be effectively corrected with an automatic control circuit that operates responsive to a dynamic azimuth monitor or by quickly carrying out a reread operation several times at different settings of the variable parameter under the control of a computer program.

According to a feature of the invention, fixed time delays are introduced into the signal paths of the read and/or write circuitry for each channel to correct skew caused by gap scatter. In conjunction with the fixed time delays, variable proportionately increasing time delays that are changed responsive to the adjustment of a single variable parameter are introduced into the signal paths of the read and/or write circuitry for each channel to correct for skew caused by azimuth misalignment. Thus, the sources of skew are corrected separately. As a consequence of the separation of the skew correction in this fashion, any necessary adjustment of the skew correction can be effected by varying a single parameter.

Specifically, each pulse to be skew corrected is first delayed by an amount determined by the value of a fixed resistor individual to the channel. This accomplishes the gap scatter correction. The delayed signal is then employed to initiate charging or discharging of a capacitor that is coupled to the first input of a differential comparator. The value toward which the capacitor voltage moves, and therefore also the slope of the voltage across the capacitor, is determined by a variable resistor. A fixed resistor indicative of the channel spacing on the tape determines the voltage applied to the second input of the differential comparator. When the voltage across the capacitor reaches the voltage across the second input, the output of the differential comparator changes state and generates the skew-corrected pulse. The time delay introduced by the differential comparator varies as the slope of the charging voltage across the capacitor and hence the setting of the variable resistor. The voltage applied to the second input of the differential comparator is a different value for each channel, increasing from the channel at one edge of the tape. Thus, the time delays introduced by the differential comparators for the various channels also increase proportionately.

BRIEF DESCRIPTION OF THE DRAWINGS

The features of a specific embodiment of the invention are illustrated in the drawings, in which.

DESCRIPTION OF A SPECIFIC EMBODIMENT

Figures 1, 4, 6:
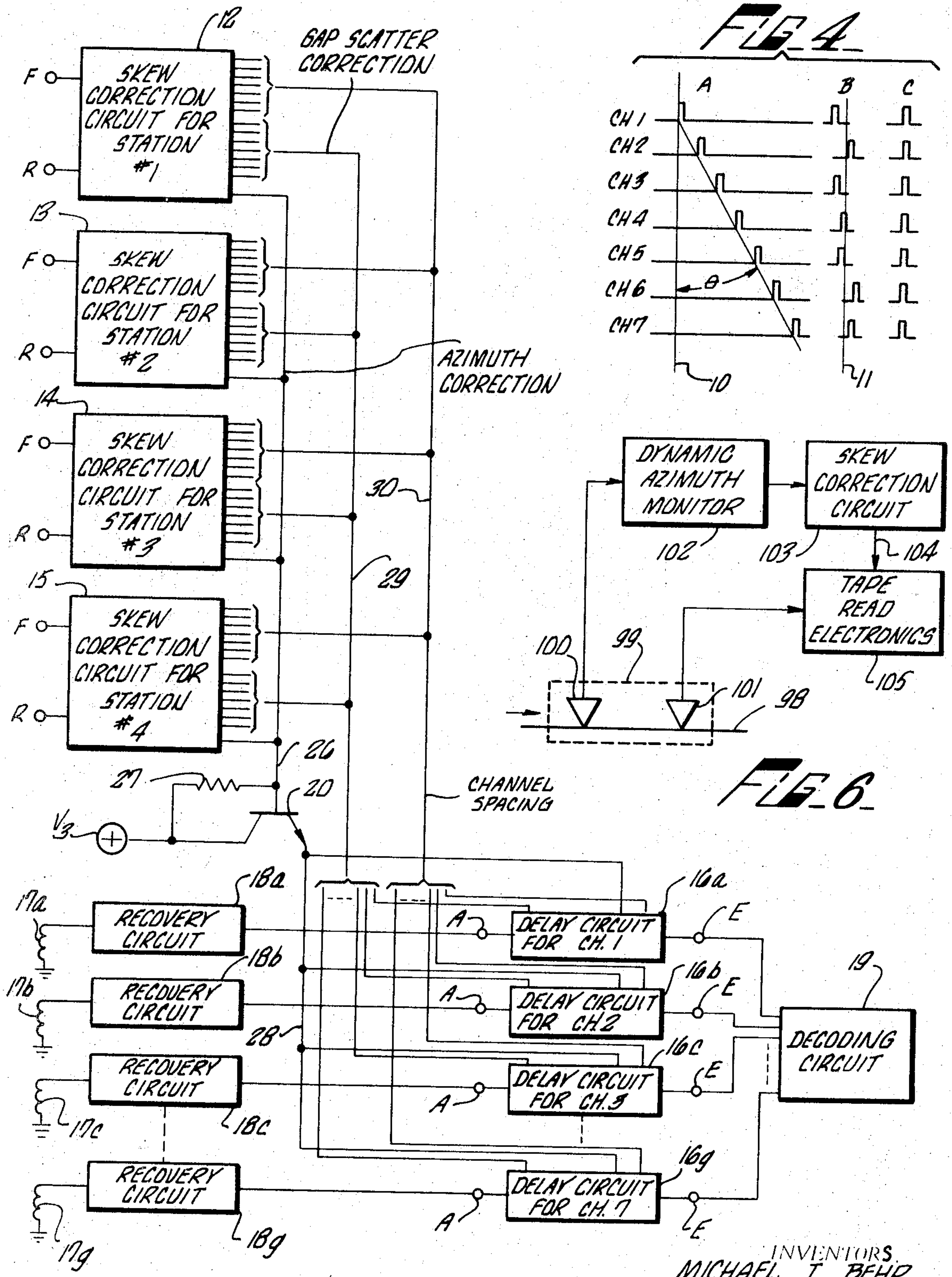
FIG. 1 is a schematic diagram partially in block form showing the interconnections between skew correction circuitry according to the invention and the signal paths of the tape channels in a multiple station tape handling system.
FIG. 4 depicts the time relationship of pulses generated in recovering the bits of a character on tape.
FIG. 6 is a schematic diagram in block form of an automatic control circuit that corrects dynamic skew misalignment.

The embodiment of the invention shown in FIG. 1 is intended for use with a four station tape handling system in which information from only one station is read at a time. Such a four station tape handling system is disclosed in Pat. 3,345,007 of Harry F. Rayfield, which issued Oct. 3, 1967, and is assigned to the assignee of the present application. The invention is, of course, equally applicable in a single station tape handling system. Information is assumed to be recorded on the tape in seven parallel, longitudinal channels although the principles of the invention are applicable to any multiple channel tape handling system. Skew attributable to two sources is corrected.

One source of skew designated azimuth misalignment is caused by deviations of the guided edge of the tape from the direction of tape transport. As a result, the tape pivots slightly with respect to the read head and adjacent bit positions lie along a line that deviates slightly from an azimuth angle of 90 degrees from the direction of tape transport. The pulses generated in the course of the recovery of the information therefore occur in misalignment. They are misaligned by amounts increasing proportionately in successive channels starting at one edge of the tape. As illustrated by pulse group A in FIG. 4, the pulses associated with a character are situated along a line forming an azimuth angle $\theta$ with a transverse line 10. The constant of proportionality of the azimuth misalignment depends upon the spacing between channels on the tape. For example, the longitudinal displacement of the bit position in channel CH7 from the bit position in channel CH1 (the distance between the pulse in channel CH7 and line 10) equals the transverse distance between channel CH1 and channel CH7 (the length of line 10 between channel CH1 and CH7) times the tangent of the azimuth angle $\theta$. The longitudinal displacement of the bit positions of every other channel is likewise equal to the transverse distance of that channel from channel CH1 times the tangent of the azimuth angle $\theta$. Thus, the azimuth misalignment increases proportionately in successive channels starting at one edge of the tape, i.e., starting at channel CH1.

The other source of skew designated gap scatter is caused by misalignment of the gaps for the channels in the magnetic read and write heads. Ideally, the heads are constructed so the centers of the gaps for all the channels are aligned on a single straight line. In practice, the gaps are scattered about an imaginary straight line in an irregular fashion. Thus, even when no azimuth misalignment takes place, the pulses recovered from the tape for each character are out of alignment. As illustrated by pulse group B in FIG. 4, the pulses recovered from the different channels are caused by gap scatter to occur at irregular points in time displaced from the mean time of occurrence respresented by an imaginary line 11. With respect to any one channel, the deviation of the recovered pulse from line 11 remains substantially fixed for a given magnetic head.

In FIG. 1, skew correction circuits 12, 13, 14, and 15 are provided reading information at four stations of a tape handling system. Circuits 12 through 15 each have an input terminal F that is energized when the corresponding station is transporting tape in the forward direction and an input terminal R that is energized when the corresponding station is transporting tape in a reverse direction. Only one of the eight input terminals for circuits 12 through 15 would be energized at any one time. Delay circuits **16*a*, 16*b*, 16*c* . . . 16*g* are provided for the seven channels of information on the tape. Each delay circuit 16 has an input terminal A and an output terminal E. The read head of the station in operation has magnetic circuits 17*a*, 17*b*, 17*c* . . . 17*g* connected through recovery circuits 18*a*, 18*b*, 18*c* . . . 18*g* to terminal A of delay circuits 16*a*, 16*b*, 16*c* . . . 16*g*, respectively. Recovery circuits 18*a*, 18*b*, 18*c* . . . 18*g* each produce short pulses of fixed duration from the read head signal. For this purpose, the circuitry disclosed in a copending application of Michael I. Behr, Charles E. Bickel, and Lewis B. Coon, Jr., Ser. No. 668,529 filed concurrently herewith, entitled "Binary Data Handling System," and assigned to the assignee of the present application, could be employed. Output terminal E of circuits 16*a*, 16*b*, 16*c* . . . 16*g* is connected to a decoding circuit 19** that decodes the binary bits forming each character.

A transistor 20 connected in the common collector configuration couples a single azimuth correction lead 26 from skew correction circuits 12 through 15 to a lead 28 connected to each of delay circuits **16*a*, 16*b*, 16*c* . . . 16*g*. A resistor 27 is connected between the base and the collector of transistor 20. A bias source V3 of positive potential is connected to the collector of transistor 20. Upon selection of one of skew correction circuits 12 through 15, a variable resistor is connected between azimuth correction lead 26 and ground. This variable resistor serves as a voltage divider with resistor 27, thereby determining the voltage at the emitter of transistor 20 that is applied to delay circuits 16*a*, 16*b*, 16*c* . . . 16*g***. As this variable resistor is adjusted, the delay introduced by the delay circuits changes in proportionately increasing amounts in successive channels starting at one edge of the tape.

Gap scatter correction leads 29, one of which corresponds to each channel on the tape, are connected at one end to each of skew correction circuits 12 through 15. At the other end, leads 29 are each connected to one of delay circuits **16*a*, 16*b*, 16*c* . . . 16*g*. Upon selection of one of skew correction circuits 12 through 15, a bank of resistors unique to the read head of the corresponding station is connected between leads 29 and ground. These fixed resistors determine the fixed delay introduced by delay circuits 16*a*, 16*b*, 16*c* . . . 16*g* to correct for gap scatter. Channel spacing leads 30, one corresponding to each channel on the tape, are connected at one end to each of skew correction circuits 12 through 15. At the other end, leads 30 are each connected to one of delay circuits 16***a*, 16*b*, 16*c* . . . 16*g*. Upon selection of one of skew correction circuits 12 through 15, a bank of resistors representing the spacing between channels on the tape of the corresponding station are connected between leads 30 and ground.

Figure 2:
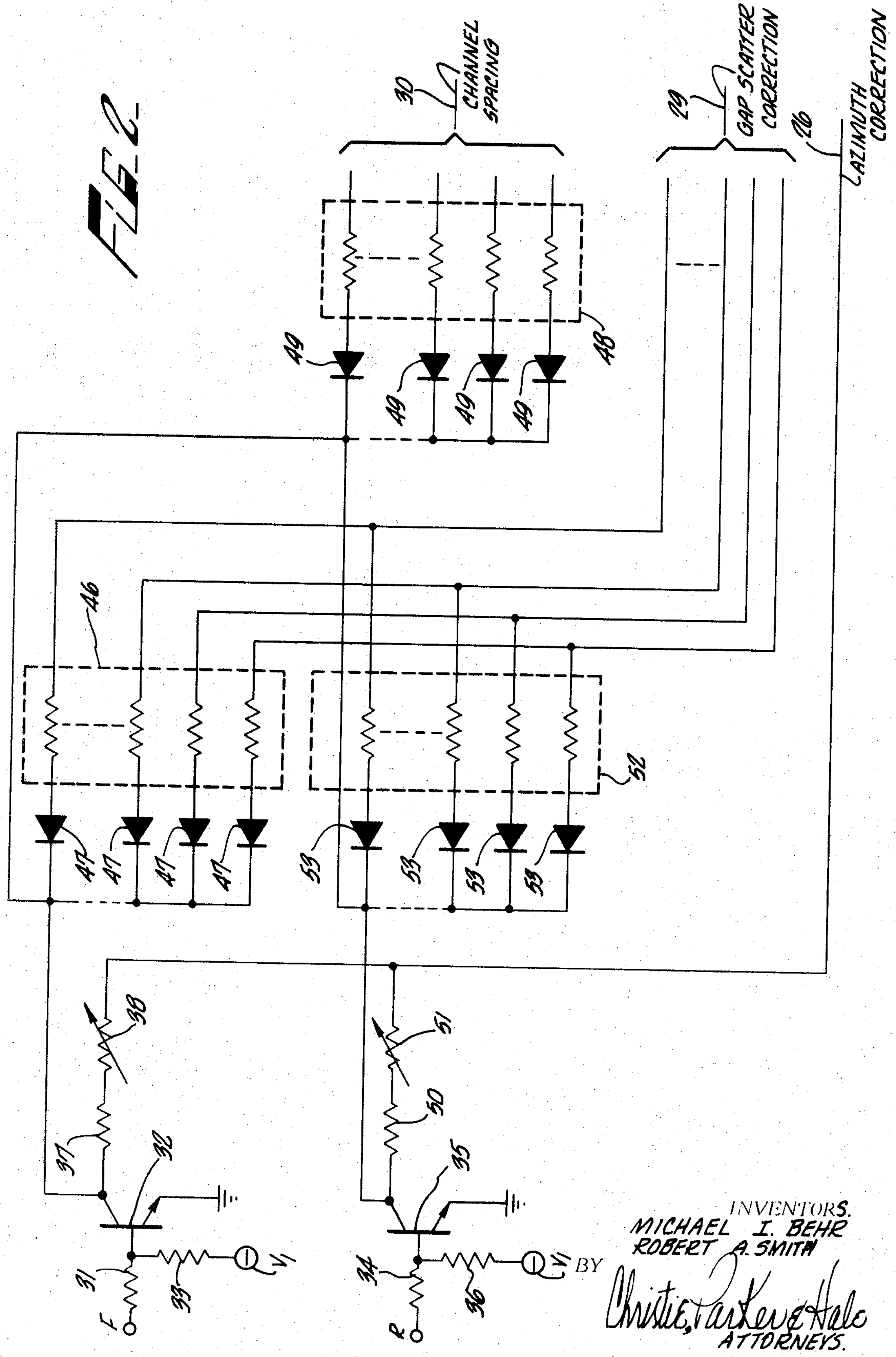
FIG. 2 is a circuit schematic diagram of the skew correction circuit for one station.

One of skew correction circuits 12 through 15 is shown in detail in FIG. 2. Input terminal F is coupled by a resistor 31 to the base of a transistor 32, which is connected in the common emitter configuration. A source $V_1$ of negative potential connected by a resistor 33 to the base of transistor 32 maintains transistor 32 in a cutoff condition absent an energizing signal at terminal F. Similarly, input terminal R is coupled by a resistor 34 to the base of a transistor 35, which is connected in the common emitter configuration. Source $V_1$ connected by a resistor 36 to the base of transistor 35 maintains transistor 35 in a cutoff condition when input terminal R is not energized. A fixed resistor 37 and a variable resistor 38 are connected in series between the collector of transistor 32 and azimuth correction lead 26. A blank 46 of seven resistors is connected between the collector of transistor 32 and gap scatter correction leads 29. Diodes 47 are connected in series with the resistors of bank 46 to isolate them from one another. A bank 48 of seven resistors is connected between the collector of transistor 32 and channel spacing leads 30. Diodes 49 isolate the resistors of bank 48 from one another. A fixed resistor 50 and a variable resistor 51 are connected in series between the collector of transistor 35 and azimuth correction lead 26. A bank 52 of seven resistors is connected between the collector of transistor 35 and gap scatter correction leads 29. Diodes 53 are connected in series with the resistors of bank 52 to isolate them from one another. Resistor bank 48 is also connected to the collector of transistor 35. The skew error is normally different for reverse and forward tape transport. For this reason, separate azimuth correction variable resistors (38 and 51) and separate gap scatter correction resistor banks 46 and 52 are provided for forward and reverse tape transport. When input terminal F is energized, transistor 32 becomes saturated and its collector drops essentially to ground potential. As a result, fixed resistor 37 and variable resistor 38, bank 46, and bank 48 influence the delays introduced by circuits 16*a*, 16*b*, 16*c* . . . 16*g* into the signal path of the signals read from the tape. When input lead R is energized, transistor 35 becomes saturated and its collector drops essentially to ground potential. As a result, fixed resistor 50 and variable resistor 51, resistor bank 52, and resistor bank 48 influence the delays introduced by circuits 16*a*, 16*b*, 16*c* . . . 16*g* into the signal paths for the tape channels.

Figures 3, 5:
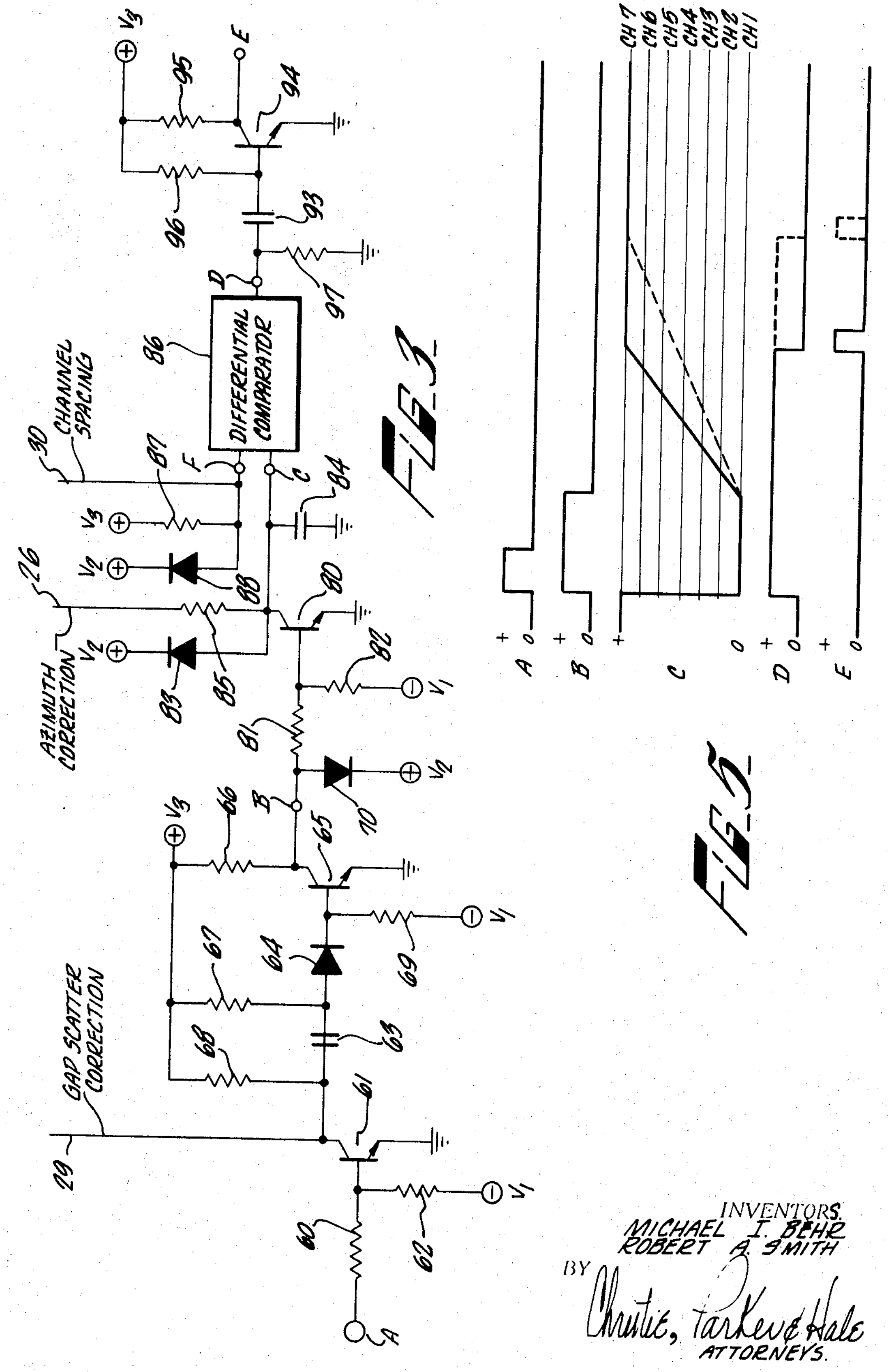
FIG. 3 is a circuit schematic diagram of the delay circuit for one tape channel.
FIG. 5 depicts waveforms illustrating the time relationship involved in the circuit of FIG. 3.

Delay circuits 16*a*, 16*b*, 16*c* . . . 16*g*, one of which is shown in detail in FIG. 3, are all identical. However, they introduce different time delays into the signal paths for the different tape channels, depending upon the value of the resistors connected to lead 26 and to leads 29 and 30. In FIG. 3, input terminal A is connected by a resistor 60 to the base of a transistor 61 in the common emitter configuration. Transistor 61 is normally biased into cutoff by source $V_1$ which is connected to the base of transistor 61 by a resistor 62. One of leads 29 is connected to the collector of transistor 61. A capacitor 63 and a diode 64 in series couple the collector of transistor 61 to the base of a transistor 65 in the common emitter configuration. A source $V_3$ of positive potential is connected by a resistor 66 to the collector of transistor 65, by a resistor 67 to one side of capacitor 63, and by a resistor 68 to the other side of capacitor 63. A resistor 69 is connected between source $V_1$ and the base of transistor 65, which is normally at a positive potential. Thus, transistor 65 is normally saturated and its collector is substantially at ground potential. On the application of a positive polarity pulse from the recovery circuit to terminal A, which is represented in wave form A of FIG. 5, transistor 61 becomes saturated and its collector drops substantially to ground potential. The drop in potential at the collector of transistor 61 is duplicated at the junction of capacitor 63 and diode 64, thereby back-biasing diode 64 and cutting off transistor 65. When transistor 65 becomes cut off, the potential at its output terminal B rises as illustrated in wave form B in FIG. 5. Transistor 65 remains cut off until capacitor 63 charges through resistor 67 to a sufficiently positive potential to saturate transistor 65 once again. The value of the resistor connected to gap scatter correction lead 29 determines the initial voltage across capacitor 63 prior to application of the pulse to input terminal A. In this way, the value of the gap scatter resistor regulates the time required for capacitor 63 to charge sufficiently to return transistor 65 to its normal, saturated condition and, therefore, the length of the pulse at terminal B. The value of the gap scatter correction resistor is much smaller than the value of resistor 67; therefore, it does not appreciably affect the time constant of the charging circuit of capacitor 63. When transistor 65 is cut off, its collector is clamped to the positive potential of a source $V_2$ by a diode 70.

Terminal B is coupled to the base of transistor 80 in the common emitter configuration by a resistor 81. Source $V_1$, which is connected by a resistor 82 to the base of transistor 80, normally biases transistor 80 into cutoff. A diode 183 is coupled between the collector of transistor 80 and source $V_2$, and a capacitor 84 is connected between the collector of transistor 80 and ground. Thus, capacitor 84 is normally clamped to the potential of source $V_2$. A resistor 85 couples the collector of transistor 80 to azimuth correction lead 26 which is at a substantially higher potential than that of source $V_2$.

Capacitor 84 is shunted across an input terminal C of a differential comparator 86. Differential comparator 86 is a commercially available circuit that has an output terminal D remaining at ground potential as long as the potential at input terminal C is larger than the potential at an input terminal F. During intervals of time in which the potential at input terminal C falls below the potential at input terminal F, output terminal D assumes a positive potential. Input terminal F is connected by a resistor 87 to source $V_3$. One of channel spacing leads 30 is also connected to input terminal F. The channel spacing resistor connected to lead 30 and resistor 87 form a voltage divider between source $V_3$ and ground. Thus, the value of the channel spacing resistor determines the voltage applied to input terminal F. The channel spacing resistors are so selected that the voltages applied to input terminal F of the delay circuits for the different channels increase in the delay circuits for successive channels starting from one edge of the tape. Thus, if the channels are equally spaced on the tape, the voltages applied to terminal F of the delay circuits for the different channels would increase in successive channels by equal increments. A diode 88 connects input terminal F to source $V_2$ to prevent the potential at input terminal F from exceeding the potential of source $V_2$.

Normally, capacitor 84 is charged to the potential of source $V_2$ and output terminal D of differential comparator 86 is at ground potential as illustrated by wave forms C and D, respectively, in FIG. 5. When the potential at terminal B becomes positive, transistor 80 becomes saturated and input terminal C drops essentially to ground potential, thereby quickly discharging capacitor 84. Input terminal C remains at ground potential until terminal B returns to ground potential, at which time transistor 80 becomes cut off again. After transistor 80 becomes cut off again, capacitor 84 begins to charge through resistor 85 toward the potential at the emitter of transistor 20 (FIG. 1). Capacitor 84 charges until it reaches the potential of source $V_2$ where it is clamped by diode 83. The rate at which capacitor 84 charges depends upon the potential at the emitter of transistor 20 This potential is in turn determined by the setting of the variable resistor (resistor 38 or resistor 51 in FIG. 2) of the selected skew correction circuit. In wave form C of FIG. 5, the solid sloping line represents the voltage across capacitor 84 for one setting of the variable resistor. Although this voltage is, strictly speaking, exponential, only a small segment of the total charging time is employed so it is approximately linear. The potentials at terminal F of the delay circuits for the various channels are represented in wave form C by equally spaced horizontal lines. When the potential at the collector of transistor 80 drops to ground, output terminal D rises to a positive potential. Output terminal D remains at this positive potential until the rising potential at terminal C reaches the fixed potential at terminal F. Then terminal D returns to ground. The differential comparator of each delay circuit has a different potential applied at its terminal F; therefore, output terminal D of the differential comparators of the different delay circuits produce positive pulses of different time duration, increasing proportionately in successive channels starting from one edge of the tape. To change the constant of proportionality, the variable resistor in the skew correction circuit is readjusted, which changes the potential at the emitter of transistor 20. Thus, the slope at which capacitor 84 charges is changed to introduce a proportional change in the point in time at which output terminal D of the differential comparators returns to ground potential. As illustrated by the dashed lines in wave forms C and D of FIG. 5, when the potential at the emitter of transistor 20 is reduced, capacitor 84 charges at a slower rate and output terminal D returns to ground potential at a later point in time.

Output terminal D is coupled by a capacitor 93 to the base of a transistor 94 in the common emitter configuration that produces a pulse of uniform width responsive to the return of output terminal D to ground potential. Source $V_3$ is connected by a resistor 95 to the collector of transistor 94 and by a resistor 96 to the base of transistor 94. A resistor 97 is coupled between terminal D and ground. Transistor 94 is normally biased into saturation by source $V_3$. After terminal D rises to a positive potential to form the beginning of the variable duration pulse, capacitor 93 charges up in a direction such that a voltage drop exists from terminal D to the base of transistor 94. When terminal D returns to ground potential to form the end of the variable duration pulse, the potential at the base of transistor 94 also drops, transistor 94 becomes cut off, and the potential at output terminal E rises. Transistor 94 remains cut off until capacitor 93 discharges to a point at which the potential at the base of transistor 94 is positive. The time duration for this to take place is constant in each channel. Thus, a pulse of constant duration is produced at terminal E responsive to the end of the variable duration pulse at terminal D, as illustrated by wave form E in FIG. 5. When the time duration of the pulse at terminal D is extended, the occurrence of the constant duration pulse at output terminal E is further delayed, as illustrated by the dashed lines of wave forms D and E in FIG. 5.

Although the invention is especially useful in connection with the storage of information on magnetic tape, because of the very high densities at which information is stored on magnetic tape, the invention is in principle also applicable in connection with the storage of information in longitudinally parallel channels on other types of tape such as punched paper tape, optically coded rolls of film, etc. In other words, the term "tape" as employed in this specification, embraces all types of elongated flexible ribbon-like information storage mediums.

The invention can be utilized either to record information on tape or to read information from tape. It has a special advantage, however, in reading information from tape because dynamic azimuth misalignment which would otherwise give rise to errors in the retrieved information can be corrected practicably. Specifically, when a parity check indicates in the course of the reading operation that an error has occurred, the corresponding portion of the tape is reread on separate passes by the read head according to one of two techniques.

The first technique is illustrated in FIG. 6. An integrated magnetic flux transducer 99 having a record head 100 and a read head 101 is located in proximity to a magnetic tape 98 traveling from left to right as viewed in FIG. 6. The multiple channel information on tape 98 is read by head 101 and coupled to tape read electronics 105, which could comprise recovery circuits **18*a* through 18*g*, delay circuits 16*a* through 16*g*, and decoding circuit 19 of FIG. 1. On reread in the course of another pass of the tape by transducer 99, the information from two channels on tape 98 is read by head 100, which is normally employed for recording. It is assumed that the gap scatter and static azimuth misalignment in the two channels read by head 100 are fully corrected by the previously described techniques and read circuitry is provided to produce properly shaped pulses. Thus, the time delay between pulses from the two channels for the same character represents the dynamic skew at head 100. Since head 101 is very close to head 100, this time delay essentially represents the dynamic skew at head 101 as well. It is also assumed the dynamic azimuth misalignment is not large enough to cause a time delay between two pulses for the same character in excess of one bit period. A dynamic azimuth monitor 102 produces a direct current control signal that is proportional to this time delay. The control signal is applied to a skew correction circuit 103 like that shown in FIG. 2. Monitor 102 could involve a ramp generator that is started and stopped responsive to the pulses, thereby converting the time delay into a peak amplitude, and a signal generator that follows in amplitude the peak of the ramp generator output. The leads connecting skew correction circuit 103 and tape read electronics 105 are represented collectively by a line 104. For the azimuth correction, two variable resistors in series could be employed in skew correction circuit 103 instead of variable resistor 38** in FIG. 2. One variable resistor would be set manually to correct the static azimuth misalignment, while the other variable resistor would be continuously adjusted by a servomechanism responsive to the control signal.

The second technique involves rereading several times the portion of the tape on which the error has occurred. Each time the tape is reread at a different setting of the azimuth correction variable resistor. If the error is due to dynamic azimuth misalignment, one of the different settings should yield a proper parity check and therefore the corrected information, which is then utilized. This operation could be carried out by a computer under the control of a relatively simple, quickly executable program.

In some applications, gap scatter error is of a much smaller magnitude than azimuth misalignment. If the effects of gap scatter error are insignificant in a particular system, azimuth correction, according to the invention, can be implemented without gap scatter correction. In either case, adjustable skew correction can be effected by setting a single variable parameter.

What is claimed is:

1. A data handling system comprising:

a plurality of tape handling stations each capable of transporting magnetic tape on which information is stored in a plurality of longitudinal channels;

a magnetic head for each station having gaps corresponding to the channels;

signal processing circuitry shared by all the stations, the signal processing circuitry having signal paths corresponding to the channels;

means for introducing into each signal path of the processing circuitry a delay that is dependent upon the value of a resistor connected to a control terminal;

a bank of fixed resistors individual to each station, the fixed resistors having such values with respect to the corresponding magnetic heads as to compensate for deviations in their gaps from a straight line transverse to the length of the tape;

means for selectively connecting the fixed resistors of each bank to the control terminals; and means responsive to the value of a single adjustable parameter for additionally introducing into the signal paths for successive channels variable delays of proportionally increasing amounts starting from one edge of the tape, the values of the variable delays changing with changes in the adjustable parameter.

2. A method for correcting skew error in recovering binary information recorded in a plurality of longitudinal channels on tape with a parity check comprising the steps of:

transporting the tape;

recovering the information in the channels separately as the tape is transported;

combining the separately recovered information;

making a parity check of the combined information;

introducing a variable delay of proportionally increasing amounts into the separately recovered information of the channels starting from one tape edge;

when the parity check indicates an error, repeatedly transporting the tape to recover the information associated with the parity check error;

setting the variable delay at different values for the repetitions of the tape transport; and utilizing the information recovered on the repetition of the tape transport indicating no parity check error.

3. A method for correcting skew error in recovering binary information recorded in a plurality of longitudinal channels on tape comprising the steps of:

transporting the tape;

recovering the information in the channels separately as the tape is transported;

combining the separately recovered information;

making an error check of the combined information;

introducing a variable delay of proportionally increasing amounts into the separately recovered information of the channels starting from one tape edge;

when the check indicates an error, repeatedly transporting the tape to recover the information associated with the error;

setting the variable delay at different values for the repetitions of the tape transport; and utilizing the information recovered on the repetition of the tape transport indicating no error.

4. A data handling system in which information is stored in a plurality of longitudinal channels on tape comprising:

means for transporting the tape;

a transducer capable of communicating individually with the channels on the tape, the transducer having a read head and a write head in an integrated structure, the write head lying in front of the read head in the line of tape travel;

a signal recovery circuit corresponding to each channel, the signal recovery circuits being coupled to the read head to produce signals representative of the information stored in the different channels on the tape;

means for reading the information stored on the tape with the write head during tape transport;

means for generating a control signal proportional to the time delay between pulses for a single character read by the first head from at least two of the longitudinal channels;

means for producing a variable delay of proportionally increasing amounts in the signal recovery circuits for successive channels starting from one edge of the tape so as to change the alignment of the signals produced by the signal recovery circuits;

means responsive to the value of a single variable parameter for changing the proportionality of the delay producing means; and means responsive to the control signal for changing the value of the single variable parameter to correct azimuth misalignment.

5. A data handling system comprising:

an information storage tape capable of storing binary information in a plurality of rows parallel to its length;

terminal circuitry for pulse signals representing binary information;

means for coupling pulse signals between each of the plurality of rows on the tape and the terminal circuitry;

means for delaying the coupled signals by variable amounts increasing proportionally in successive rows on the tape;

an adjustable circuit component; and means responsive to the value of the adjustable circuit component for varying the increasing proportional amounts of delay of the coupled signals introduced by the delaying means.

6. The system of claim 5, in which the tape is magnetic tape; the coupling means is a magnetic read head having gaps corresponding to the rows; and the terminal circuitry is a utilization device.

7. A system for recovering binary information recorded in a plurality of longitudinal channels on magnetic tape comprising:

a read head for sensing the magnetic state of the tape, the read head having a pickup element individual to each channel on the tape;

a recovery circuit individual to each channel on the tape;

means for coupling each pickup element to a different recovery circuit;

means for decoding binary information read from the tape;

a variable resistor; and means coupled between the recovery circuits and the decoding means for introducing responsive to the variable resistor a variable delay of proportionally increasing amounts for the information of successive channels starting from one tape edge, the variable delay changing as the resistance of the variable resistor changes.

8. The system of claim 7, in which the delay introducing means coupling each recovery circuit to the decoding means comprises:

means for generating pulses of a duration dependent upon the value of a fixed resistor responsive to pulses produced by the recovery circuit;

a differential comparator having first and second input terminals and an output terminal;

a capacitor connected in shunt across the first input terminal;

means responsive to the termination of the pulses produced by the pulse generating means for charging the capacitor at a rate determined by the variable resistor;

means connected to the second input terminal for producing a potential increasing in successive channels starting from one edge of the tape such that an indication is produced at the output terminal of the differential comparators at different time intervals increasing in successive channels starting from one edge of the tape; and means responsive to the indication at the output terminal of the differential comparator for generating a pulse of substantially fixed time duration.

9. The system of claim 7, in which the tape dynamic azimuth misalignment is sensed at a point near the read head and the variable resistor is automatically adjusted responsive to the sensed misalignment so the delay introducing means corrects therefor.

10. The system of claim 7, in which the read head is part of an integrated magnetic flux transducer including another head that senses the magnetic state of the tape in advance of the read head; a control signal proportional to the azimuth angle of the tape is produced responsive to the other head; and the variable parameter is adjusted responsive to the control signal to reduce the azimuth angle to zero.

11. A data handling system in which information is stored in a plurality of longitudinal channels on tape comprising:

a transducer capable of communicating individually with the channels on the tape;

a signal processing circuit individual to each channel coupled to the transducer;

means for producing a variable delay of proportionally increasing amounts in the signal processing circuits for successive channels starting from one edge of the tape;

a variable resistor; and means responsive to the adjustment of the value of the variable resistor for changing the proportionality of the delay producing means.

12. The system of claim 11, in which means are provided for sensing the tape azimuth misalignment and automatically adjusting the variable resistor to correct the sensed misalignment.

13. The system of claim 11, in which fixed delays of predetermined values are produced in the signal processing circuits.

14. The system of claim 13, in which the transducer is a magnetic head having gaps corresponding to the channels and the fixed delays are produced by resistors selected to compensate for deviations of the gaps from a straight line transverse to the tape.

References Cited

UNITED STATES PATENTS

| | | | |
|---|---|---|---|
| 3,263,223 | 7/1966 | Zenzefilis | 340—174.1 |
| 3,325,794 | 6/1967 | Jenkins | 340—174.1 |
| 3,327,299 | 6/1967 | Johnson | 340—174.1 |
| 3,349,383 | 10/1967 | Chur | 340—174.1 |
| 3,426,338 | 2/1969 | Gerding | 340—174.1 |
| 3,172,096 | 3/1965 | Peake | 340—174.1 |
| 3,193,812 | 7/1965 | Friend | 340—174.1 |
| 3,204,228 | 8/1965 | Eckert, Jr. | 340—174.1 |
| 3,349,383 | 10/1967 | Chur | 340—174.1 |

BERNARD KONICK, Primary Examiner

V. P. CANNEY, Assistant Examiner